United States Patent [19]

Doberschütz

[11] 4,417,404

[45] Nov. 29, 1983

[54] METHOD AND APPARATUS FOR MEASURING DISTANCES

[76] Inventor: Reiner Doberschütz, Kolpingstrasse 7, 5462 Bad Hönningen, Fed. Rep. of Germany

[21] Appl. No.: 286,824

[22] Filed: Jul. 27, 1981

[51] Int. Cl.³ .............................................. G01C 21/00
[52] U.S. Cl. ......................................... 33/277; 33/264
[58] Field of Search ................. 33/277, 278, 279, 280, 33/264, 284, 228

[56] References Cited

U.S. PATENT DOCUMENTS 3,434,214  3/1969  Pratt ...................................... 33/277
3,772,795  11/1973  Calvet ................................... 33/277
3,859,732  1/1975  Davin .................................... 33/277

FOREIGN PATENT DOCUMENTS 2373036  8/1978  France ................................. 33/264

Primary Examiner—Willis Little
Attorney, Agent, or Firm—Pollock, Vande Sande & Priddy

[57] ABSTRACT

The invention discloses a method and device which allows one to measure distances from one object to a remote object, e.g., the distance from a driver of one car to a car ahead of him. The method allows an observer to determine easily and at any time the exact distance between himself and the object, e.g., a driver can tell, by reading off his speed from the speedometer, whether he is maintaining the necessary safety distance between his car and the car ahead of him, thus enabling him to correct his speed if necessary. The device used for controlling the safety distance comprises a vertically adjustable scaled transparent plate which is mounted adjacent to the windshield of the car in the driver's field of view. The scale markings on this plate consist of a reference line and a sequence of scale lines parallel to the reference line and below it. The driver's eye is aligned with the reference line and the skyline of the road and then he observes the bumper of the car ahead of him at a distance "x" on the scale below the reference line. This distance "x" and the indicia of the scale allows the driver to determine the distance between his car and the car ahead of him.

8 Claims, 5 Drawing Figures

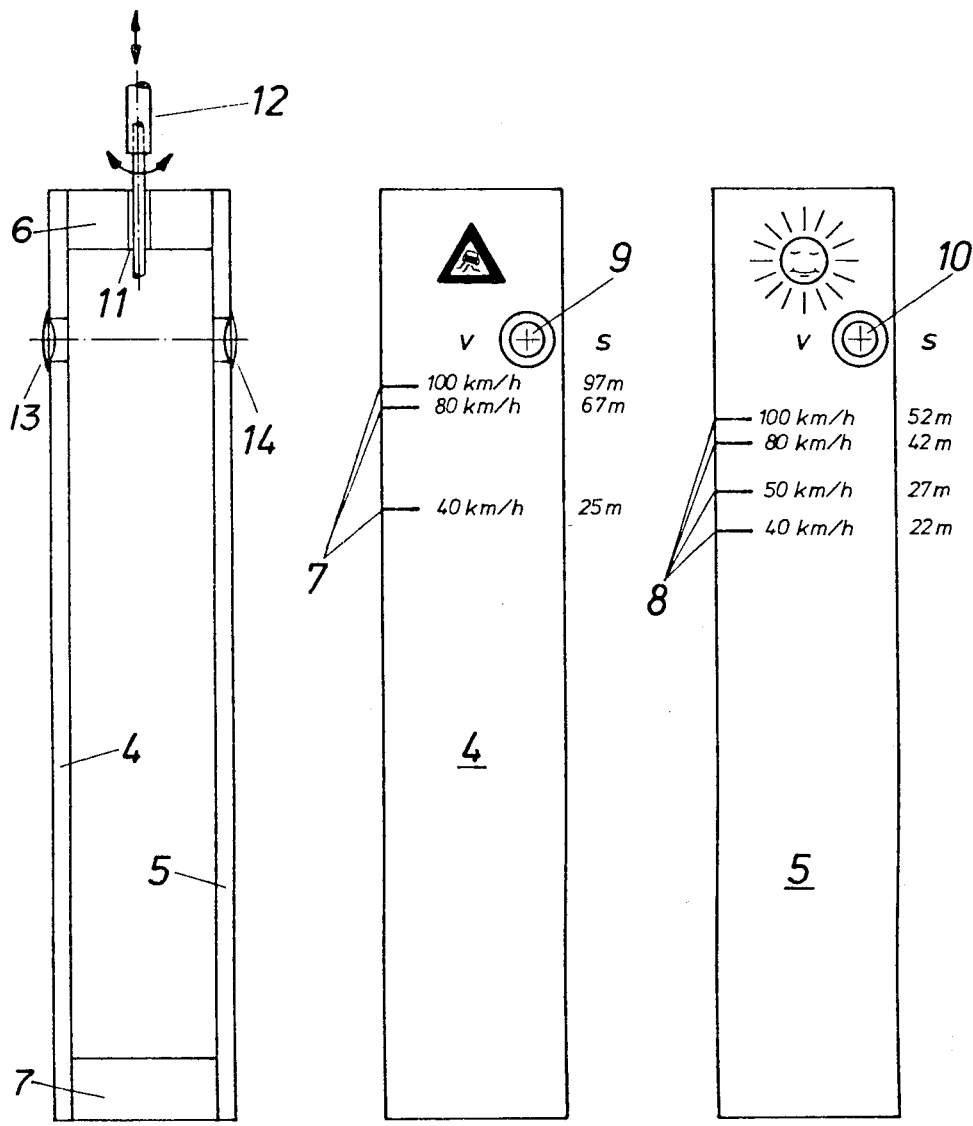
*Fig.3a*  *Fig.3b*  *Fig.3c*
safety distance needed for
wet roads          dry roads

METHOD AND APPARATUS FOR MEASURING DISTANCES

TECHNICAL FIELD

The invention relates to a method and a device for measuring the distance of an object from an observer, or the distance of the top of an object from its base (height).

BACKGROUND ART

The length of an object is usually measured by placing a ruler directly beside it and determining how many multiples of the ruler length fill out the length of the object. If the object is at a distance from the observer, neither this distance nor the object's length can be measured with a ruler in this direct way.

In general, elaborate measuring devices and/or procedures are necessary in the case just mentioned, where for example a light beam or laser beam is reflected from an object at a large distance from the source of the beam. The distance is then computed from the measured travel time of the beam and the speed of light.

It is important for the driver of a car to determine his distance from a moving vehicle in front of him, so that he can maintain an adequate safety distance that depends on the speed of his car. The safety distance is the distance needed by the driver for his braking response and actual brake application to prevent a collision with the vehicle in front of him should its driver make a sudden stop.

Since the distance between cars travelling one behind the other is relatively short, it is not in general possible to determine this distance by reflecting electromagnetic waves from the car in front.

The usual method in the past of determining the necessary safety distance has been the familiar "rule of thumb" as follows. The driver reads off the speedometer his current speed in kilometers per hour (km/h) and divides this number by two. The result, regarded as being in meters, is the minimum safety distance that must be maintained. The driver may in some situations be able to determine his distance from the car ahead by counting the number of lane divider lines (each one being 9 meters long on the freeway, or 6 meters off the freeway) or the number of guideposts (50 meters apart on straightaways) between him and the other car.

There is another method of estimating the safety distance. At the instant when the car in front is even with some prominent reference point (such as a bridge, tree or traffic sign), the driver begins counting to himself "one thousand, two thousand, . . . ". When the driver's car pulls even with the same reference point, the number of thousands that he has counted by then is the number of seconds that separate him from the car in front. From this elapsed time and his speed, the driver can calculate his distance from the car ahead.

All of these methods for determining distance between cars are clearly a burden on the driver, since continual glancing over at guideposts or counting lane divider lines or elapsed seconds, followed by mental calculations, may severely distract the driver's attention from traffic.

DISCLOSURE OF THE INVENTION

The present invention embodies a method of determining, easily and at any time, the exact distance between an observer and an object or the height of an object. One preferred embodiment includes a feature which tells the driver of a car whether he is maintaining the necessary safety distance to the car ahead of him, thus enabling him to correct his speed if necessary.

The method embodied in the invention for determining the distance of an object from an observer comprises having the observer, whose eyes are at a certain fixed distance from a vertical scale on a transparent plate, observe the relative position on the scale plate of two apparent points, corresponding to two observed points on the distant object that are a known and fixed vertical distance apart, such that an imaginary vertical line at the rear of the object connecting the lines of sight to the two observed points on the object is approximately parallel to the scaled plate. The scaled plate can be vertically adjusted and the scale markings include a reference line, which is moved into the observer's eye height, and a sequence of scale lines parallel to the reference line and above or below it. The scale lines are arranged so that when one observed point lies on the line of sight through the reference line and the other observed point lies on the line of sight through a scale line, the apparent scale line separation from the reference line is inversely proportional to the distance from the observer's eye to the distant object, since the vertical distance between the observed points and the horizontal distance from the observer's eye to the vertical scale are fixed and the lines of sight are cut into proportional segments by the plane of the scaled plate and the straight imaginary line connecting the two observed points.

For example, when the known fixed distance from the observer's eye to the scale is taken as 60 cm and a distance of 1 meter is assumed between the two observed points along the imaginary line, such as the bumper and roof of a car driving in front of the observer (these two points determining the upper and lower lines of sight of the observer), then the apparent separation on the scale of the observed points (being the separation between the line-of-sight reference line and the corresponding line-of-sight scale line) will be 26.6 mm when the car in front is 22.5 meters away. When the car is 65 meters away, the scale line separation is 10 mm and when the car is 95 meters away, the scale separation is 0.7 mm. These distances to the car ahead are the safety distances for a pair of cars travelling at 40, 80 and 100 km/h respectively. The scale lines are correspondingly marked, so that a scale of about 5 cm in length suffices to inform a driver whether he is maintaining the necessary safety distance behind the car ahead at his current speed.

The invention also embodies a method and apparatus for determining the height of an object at a known distance from an observer. The method comprises having the observer, whose eyes are at a certain fixed distance from a scale on a vertical and transparent scale plate, observe the relative positions on the scale plate of two apparent points corresponding to the observed base and top of a distant object that is at a known and fixed horizontal distance from the observer, such that an imaginary vertical line at the object connecting the lines of sight to the base and to the top of the object is approximately parallel to the scale plate. The scale plate can be vertically adjusted and the scale markings include a reference line, which is moved into the observer's reference line of sight, and a sequence of scale lines parallel to the reference line and located either above or below it. The scale lines are arranged so that when one observed point, e.g., the base of the object, lies in the line of sight through the reference line and the other observed point, e.g., the top of the object, lies in the line of sight through a scale line, the separation of this scale line from the reference line is directly proportional to the height of the object as measured along the imaginary vertical line from its base to its top. This is because the horizontal distance from the observer's eye to the vertical scale and the horizontal distance between the observer's eye and the object are fixed and the lines of sight are cut into proportional segments by the plane of the scale plate and the imaginary vertical line corresponding to the height of the object.

BRIEF DESCRIPTION OF THE DRAWINGS

The patent claims and the drawings set out the principle on which the invention is based and describe various advantageous construction features of the device. Advantageous modifications of the inventive methods and of the measuring devices used in these methods are described in the claims and in the following description of preferred embodiments of the measuring device as shown also in the drawings. These principles, features and modifications of the invention may be further understood by reference to the detailed description below taken in conjunction with the accompanying drawings in which:

FIG. 3a is an elevational view in section of a preferred embodiment of a measuring device made according to the present invention and mounted in the driver's field of view at his eye height near the windshield of his vehicle to control the safety distance between his vehicle and a vehicle in front;

FIG. 3b is a rear elevational view of the embodiment of FIG. 3a with the scale plate marked with the braking distances on wet roads; and, FIG. 3c is a rear elevational view of the embodiment of FIG. 3a with the scale plate marked with the braking distances on dry roads.

BEST MODES FOR CARRYING OUT THE INVENTION

Figure 1:
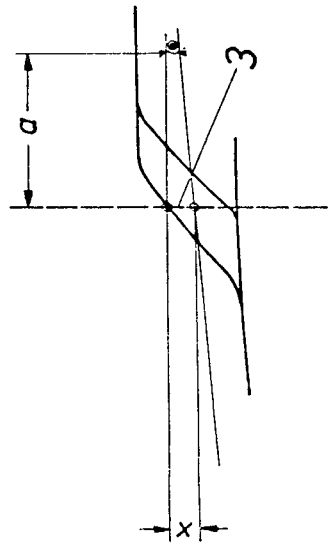
FIG. 1 is a schematic illustration of the inventive method to determine the distance of a following vehicle from a moving vehicle in front by using a device having a scale and reading from the scale the apparent scale line separation of two points of the vehicle in front, the scale line separation being inversely proportional to the distance from the observer's eye to the distant object. In this illustration, the distance between the two vehicles as measured between the observer and the bumper of the car driving in front is 22.5 meters.
Figure 1:
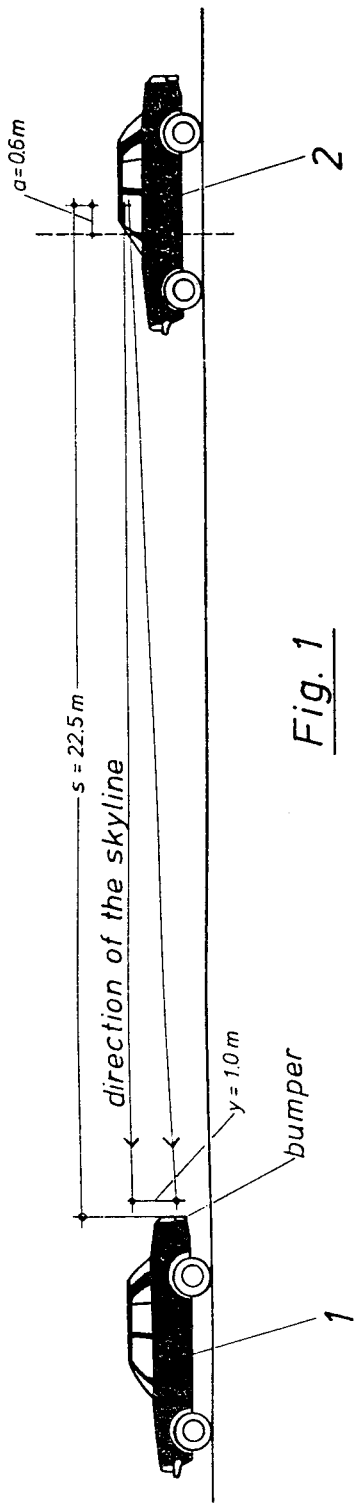

In FIG. 1, there is illustrated the inventive method for measuring the distance of an object in the case of measuring the distance between two cars by the driver of the car moving behind.

The invention is based on the following mathematic relationships: If there are two lines of sight from an observer's eye which are cut by parallel lines, the cut portions x,y of the parallel lines form the same ratio as the line of sight segments a,s between the observer's eye and the first and second parallel lines, respectively.

If there is mounted in the car 2 moving behind the car 1 a scaled plate 4 or 5 of the distance measuring device 3 near the windshield in the driver's field of view and at his eye height at a separation of the driver's eye to the scale of a=0.6 meter and if the vehicle driving in front is at a distance of s=22.5 meters, the driver will be able to observe on the scale of the scaled plate the relative positions of the bumper and roof of the distant car 1 at a scale line separation of x=26.6 mm, provided the vertical distance between the lines of sight to the bumper and roof is approximately 1 meter near the rear of the car ahead. For practical purposes, the result will be the same where the observer's eye is aligned with a line-of-sight through the reference line of the scale and parallel to the roadway. A line-of-sight parallel to a relatively flat roadway can be approximated by observing the far distance point at which the roadway apparently meets the horizon, i.e., the "skyline of the road". This line of sight is at a right angle to the scale plate and defines the higher point on the imaginary line at the distant object. In the specific embodiment for measuring distances between cars, the skyline of the road, i.e., the reference point for a line of sight parallel to the roadway, is approximated by the roof line of the car ahead. As can be seen in FIG. 1, the vertical distance "y" between the two points at the distant car is equal to the height of the driver's eye above his own bumpers.

The distance "s" of the observer or driver in the vehicle driving behind from the vehicle ahead can now be determined if the values a=0.6 meter and y=1 meter are known and if the value x between the line of sight parallel to the roadway and the line of sight to the bumper is read at the scale of the scaled plate as scale line separation since:

$$s = a \cdot y \cdot 1/x$$

The height (h) of an object can also be determined by using this equation to mark a scale on the transparent plate where "h" replaces "y" and the scaled plate is positioned at a known fixed distance "s" from the object since: $h = s/a \cdot x$. The required distance "s" for positioning the scaled plate can be determined using the odometer of the car to measure the distance traveled from the object whose height is to be determined.

Figure 2:
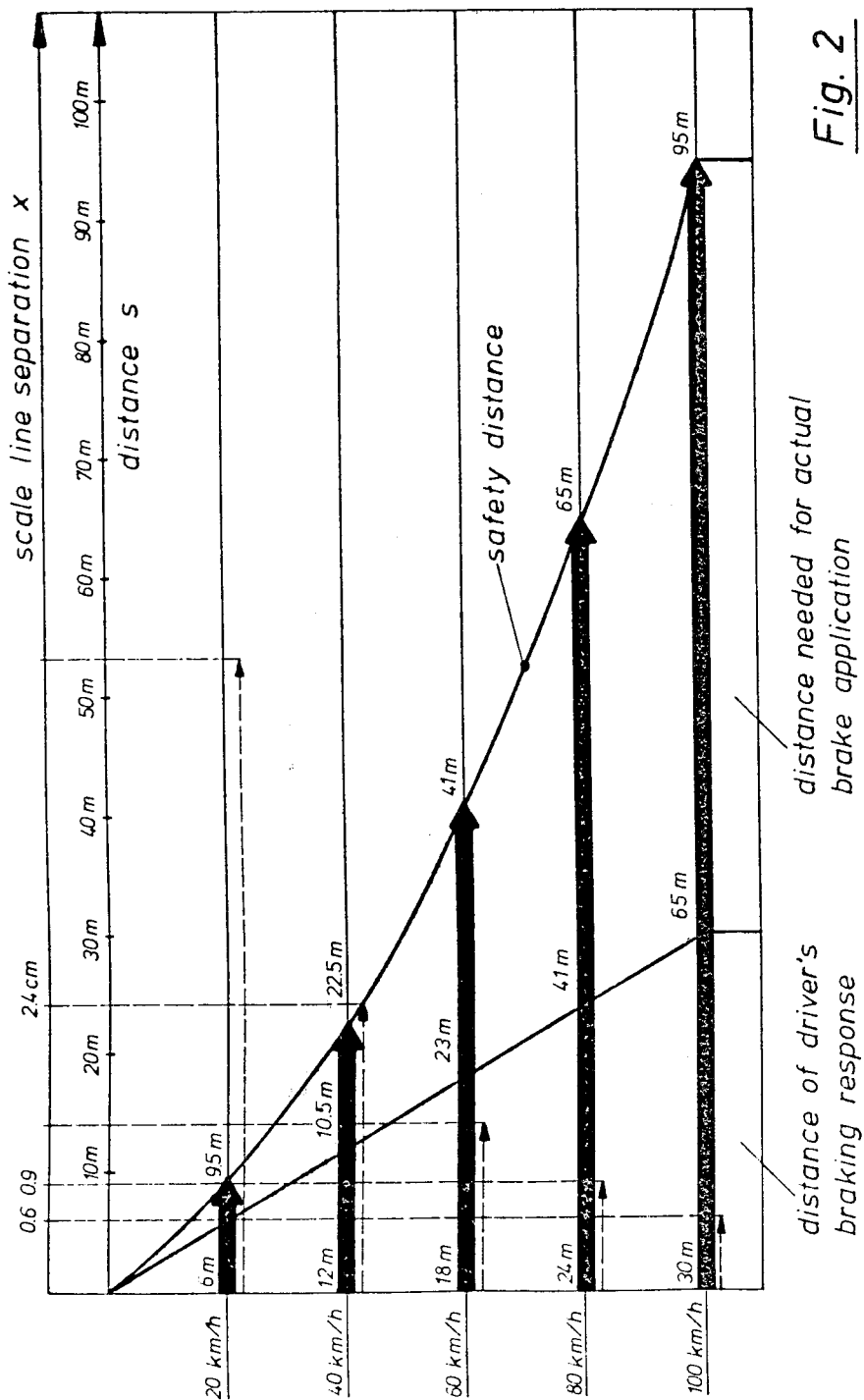
FIG. 2 is a diagram showing for various given speeds, the total braking or safety distance as made up of the distance corresponding to the driver's braking response time and the distance needed for actual brake application, and also the scale line separations corresponding to the safety distance needed as read from the scale.

The determination of the distance between the two vehicles moving one behind the other allows a comparison of this distance with the safety distance corresponding to the speed of the cars, which is known from the diagram of FIG. 2. Thus it is possible to control whether the separation of the cars is great enough or whether the separation must be increased to provide an adequate safety distance.

In FIG. 2, there are shown not only safety distances corresponding to the separations between two moving cars but also scale line separations "x" between the reference line and a scale line that correspond to the apparent distance between observed points (bumper and roof) at the car in front.

A preferred embodiment of the distance measuring device 3 according to FIGS. 3a, 3b and 3c is formed by a transparent plastic housing. The housing is comprised mainly of a first plate 4 and a second plate 5 which are connected at the top and at the bottom by spacer pieces 6 and 7, respectively, and which are arranged in parallel planes to each other.

Parallel plates 4 and 5 are each in the form of a scaled plate on which there is a sequence of parallel scale lines 7 and 8, respectively The separations between these scale lines and the reference line "v" correspond to the different safety distances between the cars.

The measuring device 3 is used not only to measure the distances between two moving cars but also allows control of whether the safety distance maintained to the car ahead corresponds to the current speed read off of the speedometer. The indications or indicia of the scale lines or of their separations may correspond not only to the separation distances but also to the current speeds of the cars (e.g., 40 km/hr, 70 km/hr, 100 km/hr, etc.) as shown in FIGS. 3b and 3c, this in an indirect way being an indication of the safety distances.

The sequence of scale lines according to FIG. 3b is in separations which indicate the braking distance on wet roads, whereas the separations of the scale lines according to FIG. 3c indicate the braking distance on dry roads. Because of the different braking distances for wet and dry roads, the speeds indicated in FIG. 3c (dry road) are at scale line separations that are of greater dimensions than the scale line separations in FIG. 3b (wet road). Depending on whether the roadway is wet or dry, the scale plate 4 or 5, respectively, is positioned toward the driver.

The reference line of the scale is marked on each of the opposing scale plates 4,5 by a circle with cross hairs enclosed. Thus it is possible to arrange the plane of the two parallel scale plates 4,5 exactly perpendicular to the line of sight of the observer through these two reference lines. This arrangement is achieved when the circles and cross hairs 9 and 10 of the respective plates 4 and 5 are observed one in front of the other.

As the roof of the car ahead must be observed in the line of sight through the reference scale lines, the scale plate is mounted near the windshield and the mounting includes means for vertically adjusting the device 3 to an appropriate height relative to the driver's eye height so as to bring the cross hairs into alignment with his line-of-sight to the roof of the car ahead. Preferably, this "reference" line-of-sight is parallel to the roadway as previously explained. As the head of the driver is usually at or near the roof of his own car, the scale and its reference line is arranged advantageously near the roof and thus the sequence of scale lines is arranged preferably with decreasing velocity and decreasing necessary safety distance from the top to the bottom of the scale plates 4 and 5. However, the invention also contemplates reference lines near the bottom of the scale plates and a reference line-of-sight to the lower point (bumper), together with scale lines arranged from the bottom to the top.

For height adjustment of the scale plates 4,5, there is a threaded bore 11 in the spacer piece 6 at the top of the housing. A threaded rod 12 is fastened to the car roof and carried in bore 11 so that the overall length of the rod 12 and the housing is adjustable. Thus the observer is able to bring the cross hairs 9 and 10 into alignment with the point to be observed on the car ahead by rotating the housing relative to rod 12 until the reference lines v,v are at the appropriate height for the observer's line-of-sight. As it is possible to turn the shaft of the rod relative to the housing, it is also possible to turn the scale plates for wet or dry roads toward the driver.

Over the reference markings 9,10 (circles and cross hairs), there are located lenses 13,14 whereby the markings 9,10 can be seen in sharp focus only at a definite distance, e.g., 0.6 meter, because of the focal length of these lenses. Thus the observer is always at the correct distance "a" in front of the nearest scale plate, which distance is used in combination with the vertical distance "y" at the distant car (roof - bumper separation of 1 meter) for gauging the scale line separations for the distances selected as scale line indicia.

So as to be able to compare the distance measured between cars with the speeds of the vehicles corresponding to the necessary safety distances for wet and dry roads, there are stated as indicia at the scale lines markings indicating both distances between cars and the maximum car velocities for which those distances are the necessary safety distances.

This additional indication of velocities corresponding to the necessary safety distances makes possible a simple control by maintaining the necessary safety distance for the car's speed at the moment. It is only necessary to view in one line-of-sight the markings 9,10 or reference scale lines v,v one in front of the other and the roof of the car ahead and then turn the eye of the observer to a different line of sight so as to view the bumper of the car ahead. If the apparent point of this second line-of-sight toward the bottom of the scale is below the scale line of the present speed of the car (the necessary safety distance), the speed of the vehicle is reduced and thus the distance between the cars increased until there is maintained the smaller scale line separation corresponding to the necessary safety distance.

INDUSTRIAL APPLICABILITY

In summary, the invention provides a new, indirect way of measuring the distance of an object which may be moving relative to the observing, measuring person. The invention further provides a way of measuring the height of an object at a known distance from the observer. There is used a transparent scale plate with a sequence of scale lines which represent the height or distance of the object, e.g., the distance or separation between two moving cars. In addition to indications of distance, indications of velocities which correspond to necessary safety distances between vehicles at various speeds may be provided. The present measuring device thus provides a very simple control and correction of the necessary safety distance.

If the use of the scaled plates and of means comprising a rigid vertical shaft in the driver's field of view for adjusting the height of the scaled plates is regarded too dangerous there may be used vertically adjusting means attachable to the plane of the windshield that is used as mounting for the scaled plates. These means are connected to the scaled plates and comprise a suction cup that becomes fastened to the windshield in appropriate height. In case of an accident the suction cup and thus the scaled plate get loose and thus is not a danger for the driver.

What is claimed is:

1. A device for measuring the distance of an object from an observer comprising a first transparent plate having a reference line and a sequence of scale lines parallel to and spaced below or above said reference line so that when said reference line is aligned in a first line of sight between the observer's eye and an observed skyline or other reference point at or beyond the distant object, when another observed point at the bottom of the distant object lies in a second line of sight through one of said scale lines, and when said first plate is parallel to an imaginery straight line connecting said observed points at the distant object such that said first and second lines of sight are cut into proportional segments by the plane of said first plate and said imaginery line, then the separation between said scale line and said reference line is inversely proportional to the distance from the observer's eye to the distant object and proportional to the distance between said two observed points along said imaginery line, said imaginary line distance and the distance from the observer's eye to said first plate each being of a predetermined value; means for vertically adjusting said first plate so as to move said reference line to the height of the observer's eye and into alignment with said first line of sight; indicia marking said scale lines with values of various distances from the observer's eye to a distant object corresponding to the separations of said scale lines from said reference line; and a second transparent plate parallel to said first plate and having at least a reference line arranged relative to the reference line of said first plate such that when said reference lines are superimposed in the observer's line of sight the planes of said first and second plates are perpendicular to said first line of sight.

2. The device in accordance with claim 1 in which a lens is located on one of said plates relative to the reference line on the other of said plates and the focal length of said lens is such that said reference line on said other plate can be seen in sharp focus only when the observer's eye is at a certain prescribed distance from said first plate and a certain prescribed height relative to both of said plates.

3. The device in accordance with claim 2 in which a circle with cross hairs enclosed is next to each of said reference lines at the plates.

4. A device for measuring or correcting the safety distance between cars for use by the driver in a following car, said device comprising a transparent first plate mounted near the windshield in the driver's field of view and perpendicular to a driver's first line of sight to an observed reference point at or beyond the car ahead, said first plate having a reference line movable into the driver's eye height, a sequence of scale lines parallel to said reference line and spaced below in such a way that the scale line separation from said reference line is inversely proportional to the distance of the car ahead from the driver, and indications of said scale line separations gauged in safety distances for given speeds or stating the speeds corresponding to said safety distances, said first line of sight and a second line of sight from the driver to an observed point on the car ahead being cut into parallel segments by said first plate and an imaginary line connecting said two observed points relative to the car ahead; and a second transparent plate arranged parallel and opposite to said first transparent plate and having a reference line arranged relative to the reference line of said first transparent plate such that when said reference lines are superimposed in the driver's said first line of sight the planes of said plates are perpendicular to said first line of sight.

5. The device in accordance with claim 4 in which said first plate has scale lines with indicia indicating braking distances on wet roads and said second plate has scale lines with indicia indicating braking distance on dry roads.

6. The device in accordance with claim 5 which further includes means for rotating said scaled plates around a vertical axis and for adjusting the height of said scaled plates relative to the eye height of said driver.

7. The device in accordance with claim 4 in which a lens is located on one of said plates relative to said reference line on the opposite of said plates and the focal length of said lens is such that said opposite reference line can be seen in sharp focus only when the observer's eye is at a certain prescribed distance from said first plate and at a certain prescribed height relative to both of said plates.

8. The device in accordance with claim 7 in which a circle with cross hairs enclosed is next to each of said reference lines at the plates.

* * * * *